United States Patent [19]

McMullan et al.

[11] 4,318,016
[45] Mar. 2, 1982

[54] TRANSDUCER

[75] Inventors: James P. McMullan, Huntington Beach; Albert Stevens, Garden Grove; Kenneth J. Metzgar, Fullerton, all of Calif.

[73] Assignee: Western Control Equipment Co., Garden Grove, Calif.

[21] Appl. No.: 127,111

[22] Filed: Mar. 4, 1980

[51] Int. Cl.³ .............................................. H02K 33/00
[52] U.S. Cl. ...................................... 310/19; 310/21; 310/29
[58] Field of Search ....................... 310/29, 24, 32, 15, 310/19

[56] References Cited

U.S. PATENT DOCUMENTS

| | | | |
|---|---|---|---|
| 1,262,326 | 4/1918 | Grabe | 310/21 |
| 2,304,485 | 12/1942 | Spencer et al. | 310/29 X |
| 3,075,101 | 1/1963 | Neff | 310/29 |

Primary Examiner—Donovan F. Duggan

[57] ABSTRACT

In combination, a water bed frame with side boards, a water filled flotation mattress within the frame, an electromagnetic vibrating transducer unit between a side board and the mattress and operable to generate and transmit motion into the mattress and an adjustable power supply connected with a 60 Hz. domestic power service and delivering current at a fixed frequency and at sub-harmonic frequencies of said fixed frequency to the unit; said unit includes an elongate resilient armature with front and rear end mounting means and fixedly mounting the rear end portion of the armature, an electro-magnetic driver fixedly mounted in predetermined working relationship with the rear end portion of the armature and receiving power from the power supply and a tuning weight on the front end portion of the armature to increase the mass thereof and shiftable longitudinally to tune the natural frequency of the armature into synchronism with the frequency of the power delivered to the driver.

10 Claims, 10 Drawing Figures

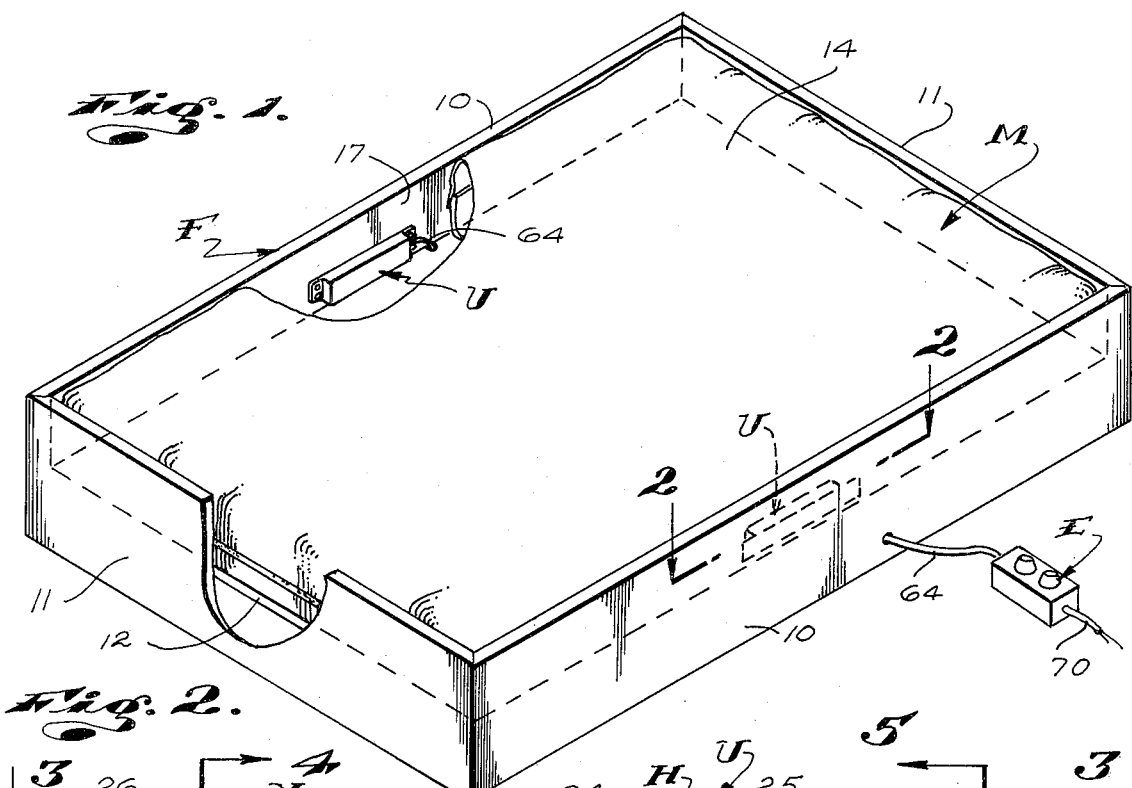
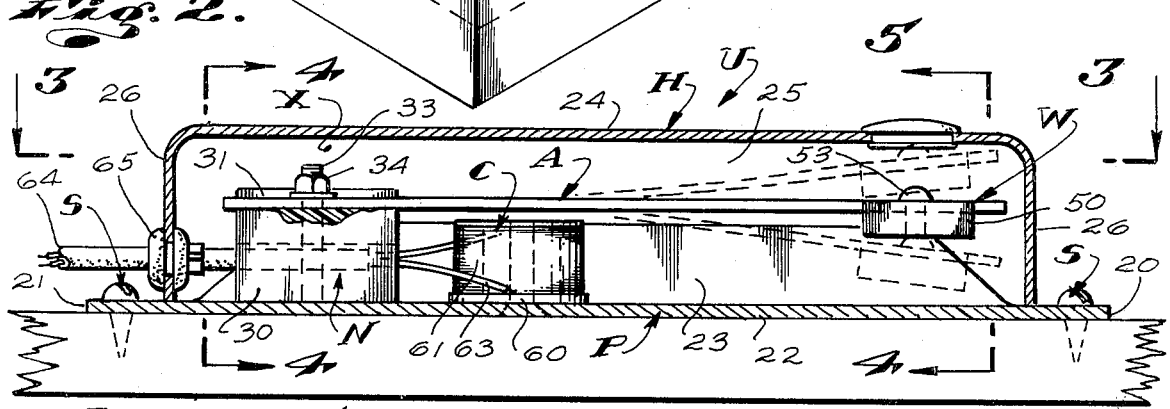
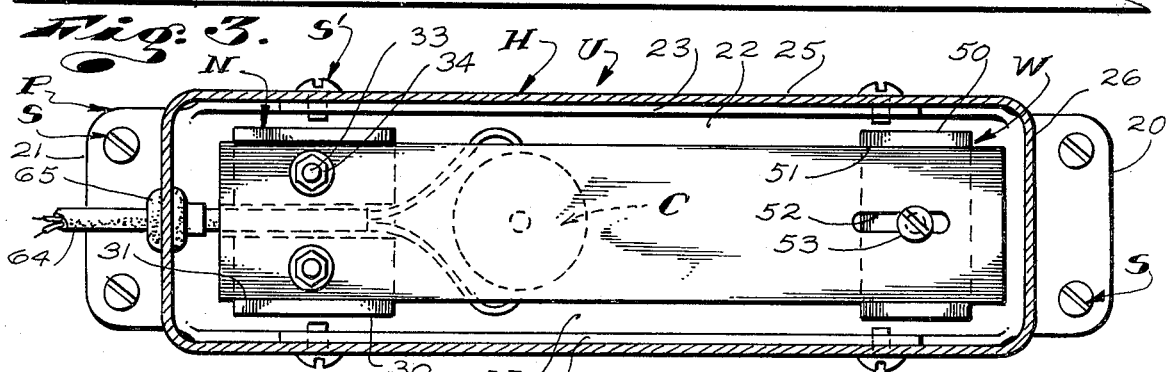
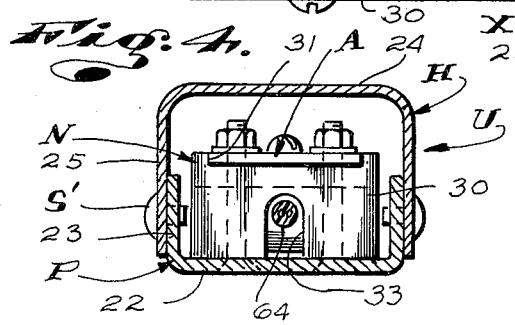
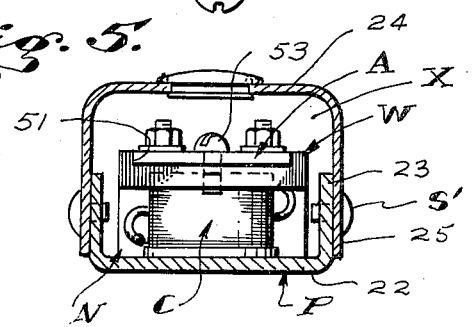

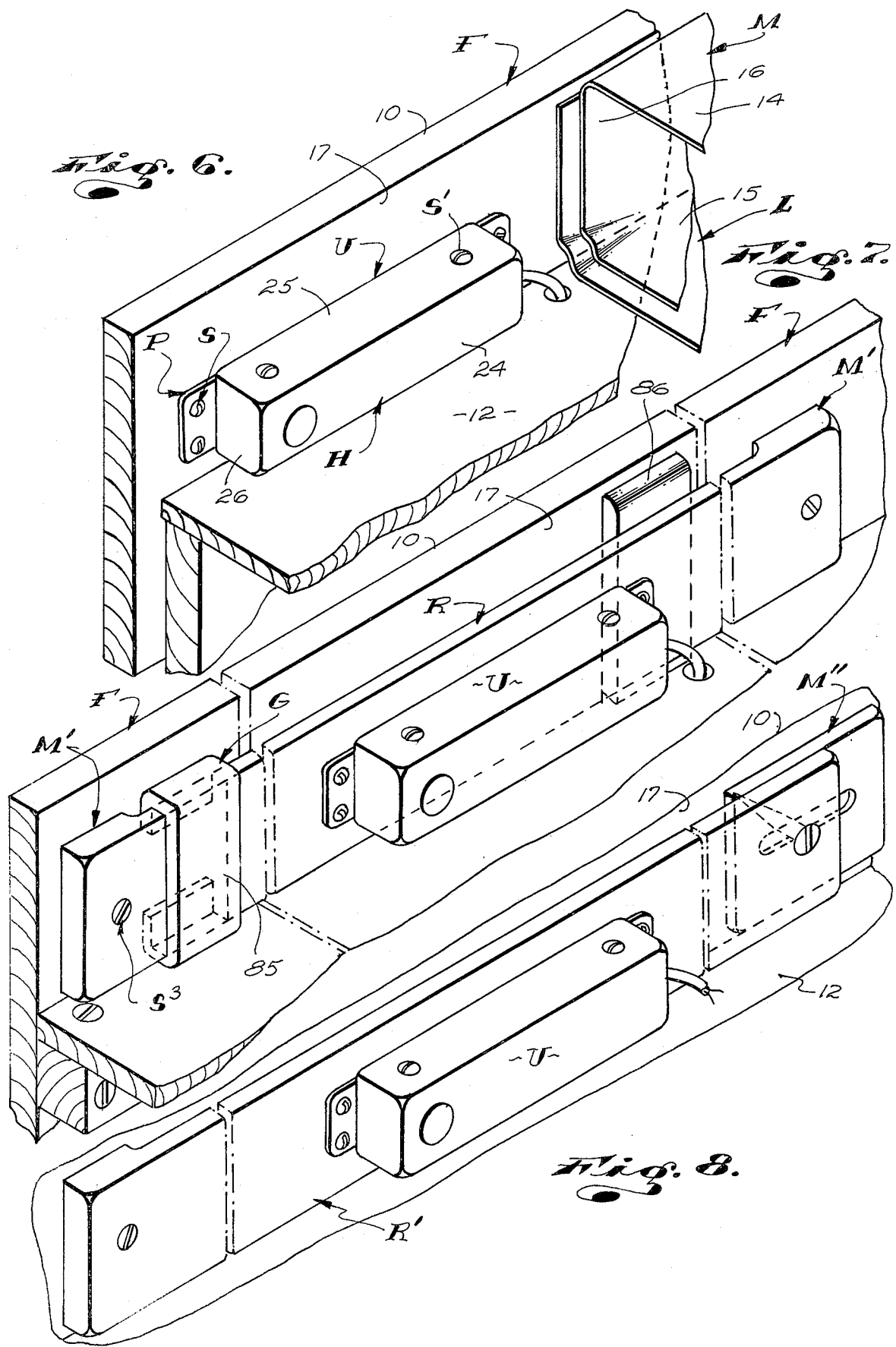

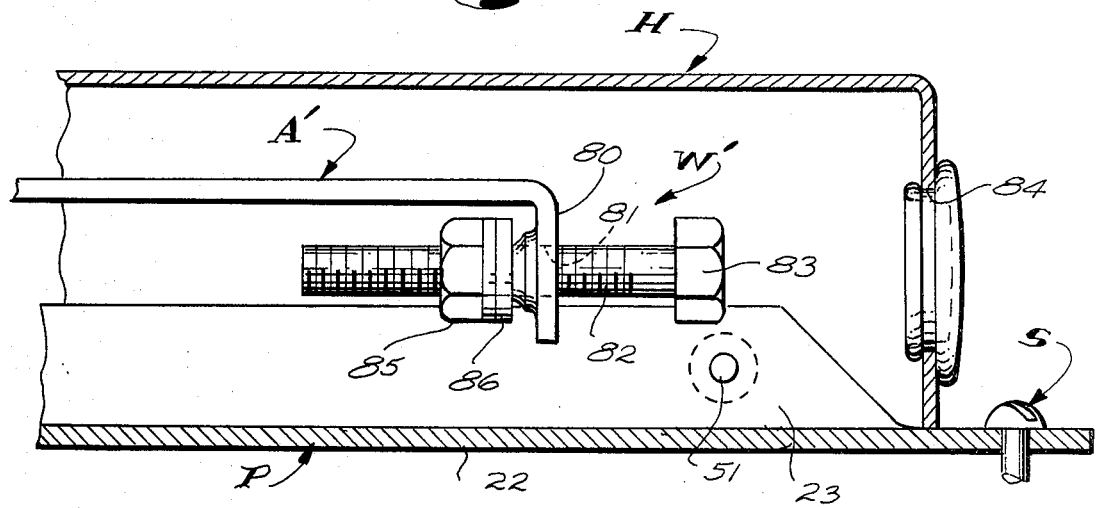
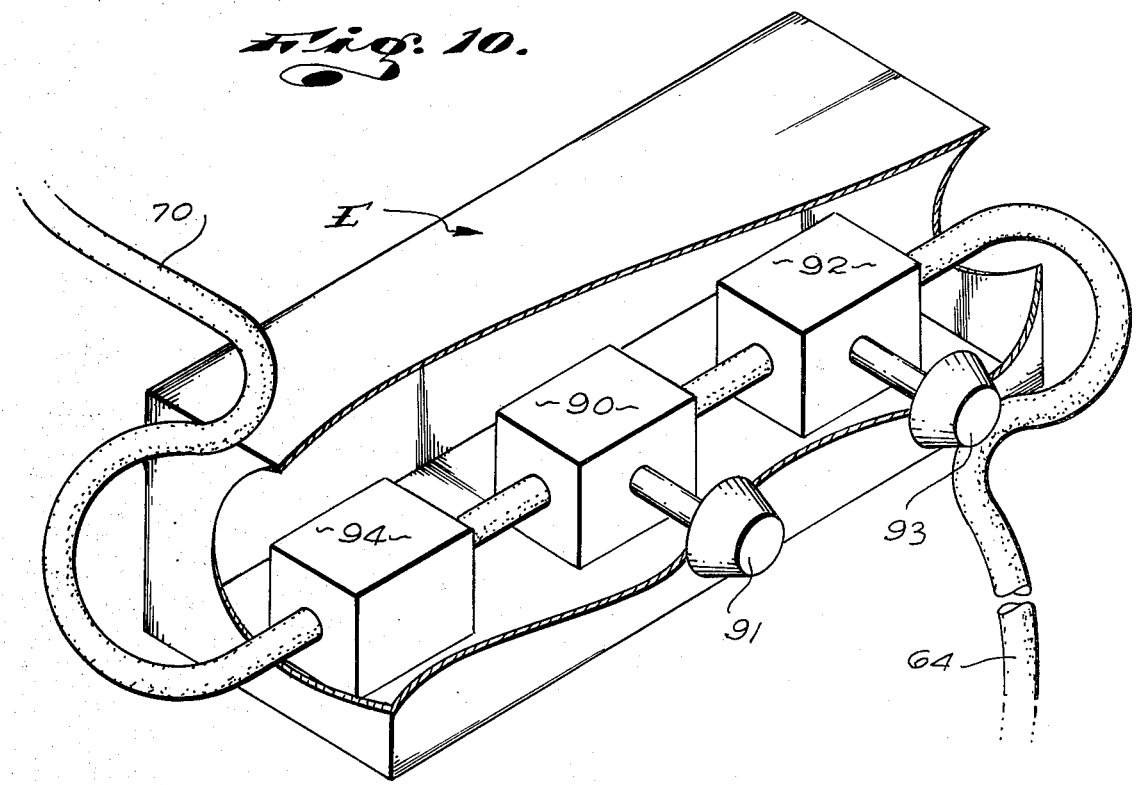

TRANSDUCER

This invention has to do with a novel transducer and is particularly concerned with a novel transducer in combination with a water bed structure.

BACKGROUND OF THE INVENTION

In the art of bedding for rest and relaxation of human beings, it has long been a practice to provide bed structures with means to vibrate, shake or otherwise impart motion into and throughout the bed structures which will induce relaxation and/or release the tension of persons lying on the beds.

Mechanical means such as motor-driven crank and lever type means and other motor driven eccentric drive means have been provided to physically move desired portions of beds in efforts to impart comforting cyclical motion into the beds. Such means have proven impractical since the sound level generated thereby is oftentimes excessive; they are costly to make; they require the construction of special bed structures to accommodate them; and they are subject to breaking down or to cause the breaking down and failure of the bed structures with which they are related.

The most common form of means for imparting restful and/or relaxing motion in bed structures has been the provision and use of electro-mechanical vibrators or transducer units; which units are related to the bed structures in such a manner that the motion generated by the units is transmitted in and through the beds in an effective manner.

The principal difficulty and/or shortcoming found in the use of electro-mechanical transducer units in bed structures resides in the fact that such units provided by the prior art are designed and constructed to operate at one unalterable, uncontrolled and unspecified frequency. In most instances, the units are fabricated without a consideration given to their resonant frequency and are likely to have a frequency between 40 and 60 Hz.

In practice, the most common and available electromagnetic transducer units used in the furniture and/or bedding art are U-shaped, strap metal springs in the nature of tuning forks. One leg or arm of the spring in this form of unit is used as a mounting plate or pad to secure the unit to a related structure to be shaken. The other leg or arm of the tuning fork-like spring is the movable part of the structure and has an induction coil fixed to its free end portion to occur in limited working clearance with and above said one leg or arm. The working clearance afforded is the required gap clearance for the resulting electro magnetic device and is such that it limits the amplitude of the vibrating motion and resulting power output of the device.

The above noted common class of transducer is so designed that it is excessively large for its power output, is of undesirable shape or poorly proportioned for use in water beds and many other environments and is notably inefficient with respect to power in and power out.

In light of the foregoing, it has been determined that the need exists for an electro-magnetic transducer unit for use in connection with water beds and the like which is comparable in size with the above noted common class of transducer but which is more efficient and puts out far greater power relative to power put in; and which is such that its natural frequency can be effectively adjusted and set in synchronism with its related power supply.

OBJECTS AND FEATURES OF THE INVENTION

It is an object and feature of our invention to provide a novel and improved electro-magnetic transducer for use in combination with a water bed structure or the like and with a simple and inexpensive adjustable power supply.

Another object and feature of our invention is to provide a transducer unit of the character referred to above which is such that its operating or natural frequency can be easily and effectively adjusted and put into exact and proper synchronization with the frequency of the power delivered to it by a related power supply and so that it can be effectively driven at its natural or any selected sub-harmonic frequency by power delivered to it by the power supply which is in synchronism.

It is an object and feature of our invention to provide a transducer unit of the character referred to above which includes an elongate, resilient, reed-like armature and an electro-magnetic driver, such as an induction coil fixedly mounted in operating relationship with the armature near its fixed end portion whereby limited vibrating motion imparted into the armature by the driver results in notably greater vibrating motion and/or travel of the free end portion of the armature remote from the driver.

Still another object and feature of our invention is to provide a transducer unit of the character referred to above which includes weight means at the free end portion of the vibrating reed-like armature to increase the power output of the unit when it is in operation and which is adjustable longitudinally of the free end portion of the armature to adjust the natural frequency of the armature whereby the unit can be tuned and put into exact and proper synchronization with the power supplied to the driver.

It is an object and feature of the present invention to provide a transducer unit of the character referred to which includes an elongate resilient power coupling or resonator board to which the driver and armature are drivingly related and which has a natural frequency.

It is an object of our invention to provide a unit of the character referred to above wherein the natural frequency of the resonator board is adjustable.

Yet another object of this invention is to provide a unit of the character referred to above wherein the resonator board includes mounting means to effectively mount the assembled board and unit in power transmitting relationship with a flotation mattress and with a side board or other supporting structure of the related bed structure.

It is an object and feature of our invention to provide a transducer unit, the operating frequency of which can be easily, quickly and accurately varied and adjusted as circumstances require.

Finally, it is an object of the invention to provide a transducer unit of the character referred to which is smaller, lighter, more efficient and less costly to manufacture than transducers provided by the prior art which have equal power input and output ratings.

The foregoing and other objects and features of our invention will be apparent and will be fully understood from the following detailed description of typical preferred forms and applications of the invention, throughout which description reference is made to the accompanying drawings.

FIG. 1 is an isometric view of a water bed structure with transducer units provided by our invention related to it and with portions broken away to better illustrate the invention;

FIG. 2 is an enlarged detailed sectional view taken substantially as indicated by line 2—2 on FIG. 1;

FIG. 3 is a view taken substantially as indicated by line 3—3 on FIG. 2;

FIG. 4 is a view taken substantially as indicated by line 4—4 on FIG. 2;

FIG. 5 is a view taken substantially as indicated by line 5—5 on FIG. 2;

FIG. 6 is an isometric view showing the unit that we provide related to a portion of a water bed structure;

FIG. 7 is an isometric view similar to FIG. 6 showing another form of the invention;

FIG. 8 is a view similar to FIG. 7 showing yet another form of the invention;

FIG. 9 is an isometric view of a portion of another form of the invention; and

FIG. 10 is a diagram for a power supply.

DETAILED DESCRIPTION OF THE INVENTION

In FIG. 1 of the drawings, we have shown a typical water bed structure comprising a frame F, a flotation mattress M related to the frame, and transducer units U, provided by the present invention, related to the frame and mattress.

The bed frame F includes a pair of flat, vertical laterally spaced side boards 10, similar end boards 11, and a flat horizontal platform 12 arranged substantially freely within the side and end boards in predetermined vertical spaced relationship from the upper rim edges of the boards.

The frame F can be fabricated of wood, chipboard, plywood, masonite board, styrofoam, plastic or any combination of those and other suitable construction materials.

The flotation mattress M is a bladder of flexible plastic sheet material (such as polyvinylchloride) and is filled with a suitable fluid medium such as water (not shown). The mattresss M has flat, horizontal top and bottom walls 14 and 15 and vertical side and end walls 16. The mattress is arranged within the frame F with its bottom wall 15 engaged and supported by the platform and with its side walls 16 engaged, supported and retained by the inside surfaces 17 of the side and end boards 10 and 11. The mattress M is preferably such that its top wall 14 normally occurs in a plane which is close to the same plane on which the upper rim edges of the boards 10 and 11 occur.

In practice, and as shown at L, in FIG. 6 of the drawings, a plastic liner sheet is provided within the frame to protect the mattress from damage by surface irregularities that might occur in the frame and to contain water that might leak or spill from the mattress, should the mattress leak or rupture.

In practice, flotation mattresses of the character here concerned with are 5 to 10 inches in vertical extent or depth.

When in use, the bodies of persons engaged on or lying atop the mattress M depress the top wall 14 and displace the water within the mattress to buoy up and support their bodies in a uniform and comforting manner.

In practice, the side and end boards of the frame are often related to or with the platform so that sufficient clearance occurs therebetween to allow for limited free relative movement of the boards relative to the platform or vice versa.

The details of construction of the frame and of the mattress can vary widely in form without affecting the novelty and/or spirit of our invention. Accordingly, further detailed description of the bed structure can and will be dispensed with.

In FIG. 1 of the drawings for purposes of illustration, we have shown two transducer units U, provided by our invention, in combination with the bed structure. One unit U is positioned at the inside surface 17 of each side board 10 of the frame, intermediate the ends of said side board and above or adjacent to the top plane of the platform 12. The units U occur in direct motion or power transmitting contact with the compliant side boards and the surfaces of the mattress M which oppose and are supported by the side boards (with the liner L occurring therebetween).

In practice, a single unit U can be employed. Further, units U might be related to the end boards 11 to the platform 12 or any other compliant part or member of the frame which is in power transmitting engagement with the mattress, as desired or as circumstances require.

Referring to FIGS. 2 through 5 of the drawings, each unit U includes an elongate, flat, plate-like frame P having front and rear ends 20 and 21, a flat horizontal plate-like base 22 and vertical side flanges 23.

The end portions of the base 22 of the frame can be provided with fastener receiving openings through which the screw fasteners S can be engaged to secure the unit U to a related supporting structure, such as the inside surface 17 of a side board 10 of its related water bed frame, with the bottom surface of the base 22 in flat bearing engagement with the board.

In practice, the weight of the mattress bearing on the unit is generally sufficient to hold the unit in place against the side board and the use of screw fasteners need not be resorted to.

The unit U next includes an elongate downwardly opening box-like cover or housing H with flat top, side and end walls, 24, 25 and 26 overlying the base with the end walls 26 spaced longitudinally inward of the ends 20 and 21 of the base and of the fasteners S. The side walls 25 of the housing slidably engage and overlie the outside surfaces of the flanges 23 of the frame. The housing H can be releasably fixed with the frame by screw fasteners S' engaged through registering openings in the side walls 25 and flanges 23, from outside the cover, as clearly illustrated in the drawings.

With the above relationship of the frame and housing, it will be apparent that the frame and housing cooperate to define an elongate chamber X, which chamber accommodates other parts and portions of the unit, as will hereinafter be described.

The unit U next includes support means N on and projecting upwardly from the rear end portion of the base 22, within the rear portion of the chamber X, to mount the rear end portion of an elongate armature A.

The armature A is an elongate, normally horizontal longitudinally extending, flat bar or strap-like part of resilient material such as spring steel. The armature has front and rear ends and is arranged to extend longitudinally freely in and through the chamber X between the front and rear ends thereof.

In practice, the armature A could be established of any desired, resilient, non-ferrous material and could have fixed to it and carrying a ferrous metal part to be acted upon by a magnetic field, without departing from our invention.

The mounting means N for the armature A can vary widely in practice and in the form of the invention illustrated, includes a simple block 30 established of a suitable, dimensionally stable material. The block 30 has a flat bottom surface which opposes and establishes flat bearing engagement on the top surface of the base 22 of the frame P. The block is shown as having a flat top with a longitudinally and upwardly opening armature orienting channel 31 in which the rear end portion of the armature A is seated. The base 22 of the frame P, block 30 of the means N, and the rear end portion of the armature A are secured in fixed assembled relationship by a pair of laterally spaced vertical tiebolts 32 engaged upwardly through registering openings in the base, block and armature and on the upper ends of which nut and lock washer assemblies 33 are engaged to hold the several parts in tight, clamped relationship.

With the structure set forth above, it will be apparent that quick and accurate assembly of the frame, block and armature is made quite simple and upon advancing and tightening of the nut and washer assemblies 33 on the bolts 32, the assembled parts are secured in substantial fixed relationship with each other.

In practice, the bolt, nut and washer assemblies can be replaced by rivet type fasteners engaged through the base, block and armature and the upper and/or lower can be struck and formed to secure the assembly.

The central and forward portions of the armature A project freely forwardly from the block 30, through the central and forward portions of the chamber X to normally occur in spaced parallel relationship between the base 22 of the frame and the top wall 24 of the housing H.

The portion of the armature A projecting freely forwardly from the block 30 is a resilient reed-like element which has a single natural resonant frequency.

Further, the weight or mass of the armature A alone and the power it generates and transmits through the block 40 and frame F, when it is vibrated, is limited and rather small.

So as to increase the mass and resulting power generated by the armature A and to effect tuning, altering, varying and/or adjusting its natural frequency, the present invention provides axially or longitudinally shiftable weight means W at the outer forward free end portion of the armature.

The weight means W can vary widely in form and construction and is shown as including a metal block-like tuning weight 50. The weight 50 is of limited vertical and longitudinal extent and is greater in lateral extent than the armature A. The block-like weight 50 has a longitudinally extending and upwardly opening guide channel 51 corresponding in cross-section with the cross-section of the armature A and cooperatively slidably receives the forward end portion of the armature. The forward end of the armature has a central, vertical, longitudinally extending fastener receiving slot 52. A vertical set screw 53, with a head accessible at the top of the armature, is engaged through the slot 52 and into a threaded opening provided in the weight 50. The screw when advanced tightly in the assembly operates to retain and to releasably secure the weight 50 in set position longitudinally of the armature.

It will be apparent that the natural frequency of the armature A is effected by the longitudinal positioning of the weight 50 and that by loosening the screw 53 and manually sliding and adjusting the longitudinal placement of the weight on the aremature, the natural frequency of the armature can be effectively adjusted and set (by tightening the screw 53), as desired, and as circumstances require.

Of equal importance, the mass of the weight 50 greatly increases the effective operating mass of the armature since the weight occurs at the forward free end portion of the armature, remote from the mounting block 30, where maximum displacement or motion in the construction occurs. The longitudinal extent of the portion of the armature between its fulcrum at the block 30 and the center of mass of the weight 50 serves as a lever arm for and affords the weight substantial mechanical advantage and power producing capacity when the construction is in operation.

The forward end portion of the armature A is normally spaced below the top wall 24 of the housing H a sufficient distance to allow for free anticipated upward deflection of that end of the armature and is spaced above the base 22 of the frame P a sufficient distance to accommodate the weight 50, beneath the armature, to allow for free anticipated downward deflection of the armature when the unit is in operation without the weight striking the base 22.

The central portion of the armature A immediately forward of the mounting block 30 is spaced above the base 22 of the frame P a distance sufficient to freely accommodate an electro-magnetic driver C therebetween, as clearly shown in FIGS. 2 and 3 of the drawings.

The driver C is shown as a simple, small and inexpensive commerically available induction coil comprising a vertical cylindrical ferrous metal spool about which a conductor coil or winding is wound.

The driver C is arranged within the chamber X, adjacent the forward side of the mounting block 30 and has a flat lower end in flat bearing, supported engagement on the top surface of the base 22 of the frame P. The driver has a flat upper end which occurs in predetermined spaced relationship below and opposes the bottom surface of the portion of the armature A immediately forward of the block 30 and above the coil.

The core or the driver C is secured to the base 22 by a screw fastener $S^2$ entered upwardly through an opening in the base and into a central threaded opening provided in the core of the coil, substantially as shown.

The winding of the driver coil has terminal end portions 63 which extend from the coil and connect with the forward ends of related conductors of an elongate power delivery cord 64 in accordance with common practice. The forward end portion of the cord 64 extends through an insulating grommet 65 engaged in an opening (or slot) formed in the rear end wall of the housing H, as clearly shown in the drawings.

In the form of the invention illustrated, the bottom or lower end of the mounting block 30 of the means N is provided with a central longitudinal channel 66 to accommodate and/or through which the inner forward end portion of the delivery cord 64 extends.

The driver C can be any suitable electro magnetic or electro dynamic device which is effective to act upon or with the armature to set and maintain it in desired vibrating motion.

With the construction thus far described and illustrated in the drawings, it will be apparent that upon cyclical energizing of the driver C, the armature A is intermittently drawn downwardly toward the driver. If the frequency of operation of the driver and the set or turned frequency of the armature are the same, or harmonically related, the driver starts and maintains the armature, with its related weight means W in vibrating motion substantially as indicated in dotted lines in FIG. 2 of the drawings.

With the structure thus far described, it will be apparent that when the driver C is enertized, the rear part of the central portion of the armature A immediately forward of the block 30 and above the driver is yieldingly driven downwardly thereby, biasing the armature downwardly and moving the forward end of the armature and the weight means W downwardly a substantially greater distance then the movement of the armature opposite the driver. When the driver is de-energenized, the armature resiliently returns upwardly to and beyond its normal straight or horizontal condition and will containue to vibrate up and down at its tuned frequency. By cyclically energizing the driver at the same or at a suitable sub-harmonic frequency, the armature will continue to vibrate. The power generated by the armature is directed and/or conducted to and through the block 30 of the means N, through the base of the frame P and into and through the compliant supporting structure against which the frame P is held or secured.

By operating the driver C at the natural frequency of the armature A or at sub-harmonic frequencies thereof and/or by increasing and decreasing the electric power to the coil, the amplitude or extent to which the armature moves can be increased or decreased and the output power generated by the unit can be increased or decreased through a wide range, as desired or as circumstances require.

Due to the resiliency, length and (weighted) mass of the armature, and when the frequency of the driver and armature are in synchronism, it takes much less input power to the driver to establish and maintain the armature vibrating at a desired amplitude and to produce desired output power than would be required to maintain a shorter, stiffer, unweighted reed-type armature in motion to produce the same power output. Accordingly, the driver C in our invention can be notably smaller, lighter and therefore less expensive and draw less energy or power than drivers of other transducer units proviced by the prior art.

To alter or change the natural frequency of the armature, the means W is adjusted longitudinally on the armature A. For example, when the natural frequency of the armature is set at 30 Hz. or 40 Hz., the weight 50 of the means W is near its rearmost position on the armature. To decrease its natural frequency to, for example, 20 Hz., the weight 50 is moved longitudinally outwardly toward the free end of the armature. In such a case, the natural frequency of the armature can be adjusted and set to any desired operating frequency between, for example, 10 Hz. and 40 Hz.

In practice, and to facilitate adjusting the position of the weight 50 on the armature without requiring removal of the housing H or otherwise disassembling the unit, the top wall 24 of the housing H can be provided with an opening 54 through which ready access to the block screw 53 of the means W is had, by means of a screw driver or the like. The opening 54 can be closed by a removable plug 55.

In carrying out our invention, any common or special power supply means can be provided and used to deliver power to the unit U. For example, an adjustable power supply E can be provided and used to adjust both the frequency and the amperage of the current supplied to the driver. The means E would be a separate unit which could be positioned at a desired station remote from the unit U.

As shown in the drawings, the means E is at the exterior of the frame of the bed with which the unit U is related. The means E is connected with the outer free end of the power delivery cord 64 of the unit and has a power supply cord which extend therefrom and connect with a 120 volt 60 cycle alternating current domestic power supply (not shown). The form and circuit of the means E can vary widely in form and can, in practice, be a relatively small, compact and economical to make circuit. For the purpose of this disclosure, the means E is shown in block diagram in FIG. 10 of the drawings and will be further described in the following:

In FIG. 9 of the drawings, we have shown the forward end portion of another form of armature A' with another form of weight means W' related to it.

In this second form of the invention, the forward terminal end of the armature has a downwardly turned flange 80 with a central longitudinally extending threaded through opening 81 formed therein. The weight means W' includes an elongate threaded tuning weight bolt 82 engaged through the opening 81 and having a head 83 at its forward end. The bolt is accessible through an opening 84 in the front end wall of the housing.

It will be apparent that this second form of armature and weight means is easy and economical to manufacture, is easy and convenient to operate (to effect adjustment of the natural resonant frequency of the armature A) and that it might, in certain respects, be more desirable than the first described weight means W.

In addition to the bolt 82, the means W' can include and is shown provided with secondary weights in the form of nuts 85 and washers 86 which are suitably engated on the bolt. By adding and subtracting washers 86 and/or nuts 85, the mass and the tune or frequency of the armature can be adjusted.

Referring to FIG. 6 of the drawings, the unit U is shown fastened to the inside surfaces 17 of a compliant side board 10 of its related water bed frame, whereby power or motion generated by a unit U is conducted directly into and through that board to be transmitted directly therefrom into and through the mattress M. A limited portion of the mattress overlies the housing H in motion transmitting contact therewith.

In the above construction the side board 10 functions as a resonator board to distribute and transmit the motion generated by the unit into and through the mattress M. In such a case, the side board can be considered to be an element or part of the unit U.

If the side board 10 or other supporting structure for the unit U is resiliently dead, it will serve to dampen and/or buffer the motion generated by the unit and adversely affect or prevent attainment of the desired end.

In FIG. 7 of the drawings, the unit U, in addition to the structure thus far described, includes a flat, vertical, elongate, longitudinally extending resonator board R on which the frame P or base 22 of the unit U is secured and which operates to distribute and transmit motive power generated by the unit U. The board R can be of substantial longitudinal and vertical extent so as to present a large mattress engaging and/or supporting surface area. For example, the board R can be about 3" in vertical extent and 5' in longitudinal extent and yet be substantially universally applicable to most common water bed structures.

The above structure is intended and is particularly suitable for use in those situations where the structural parts or portions of a related bed frame with which the unit U is or would be related are resiliently dead and such that they are incapable of or unsuitable to conduct the motion generated by the unit and transmit it into a related mattress.

The board R has mounting means M at its opposite ends to support the board and, if desired, secure the board to the side board 10 of its related bed frame F (or other part of the bed frame structure) with the portion of the board between the means M supported in working spaced relationship from the board 10. The mounting means M is shown as comprising simple blocks or pad-like parts or portions at the opposite ends of the board and through which mounting screw fasteners $S^3$ are engaged.

If desired, the resonator board R can be pretuned to some predetermined natural frequency, such as 20 Hz. (or a desired sub-harmonic thereof) or can be provided with frequency tuning means G, which means can, for example, comprise a C-shaped longitudinally shiftable tuning bar 85 engaged about one end portion of the board.

By movement of the tuning bar 85 longitudinally of the board R, the natural frequency of the board can be adjusted to the same set natural frequency of the unit U or to some harmonic thereof, as desired.

Alternatively, the tuning bar, as shown at 86 in FIG. 7 of the drawings, could be replaced by a simple wooden wedge-like tuning block engaged between the board R and the side board 10 or other related supporting structure.

In FIG. 8 of the drawings, we have shown another form of resonator board R' wherein one of the pads of the mounting means M', at one end of the board R, is axially shiftable relative to the board R' to effect adjusting the natural frequency of the board R'.

With the forms of our invention which include the above noted resonator boards, it will be apparent that the resonator boards present substantial and sufficient mattress engaging surface area so that the motion or power output of the units is most effectively and efficiently distributed to impart desired motion in and through their related mattresses.

These last noted forms of our invention are particularly suitable for use in connection with those water bed structures wherein the bed frames constructed and securely fashioned so that the rails 10 or other parts thereof with which the unit O might be related are rigid and incapable of effectively conducting and transmitting the motion generated by the unit and/or where those parts are formed of resiliently dead material such as a foam plastic or the like.

Referring again to FIG. 10 of the drawings, the power supply unit or means E can include a variable frequency modulating component or an adjustable frequency selector component, indicated at 90 and under control of a manually engageable knob 91 and a power modulating component 92 under control of a manually engageable knob 93. Still further, the unit can include a rectifier component 94 to change the 110 Hz. AC power supplied to the unit E to, for example, 20 Hz. pulsating direct current, whereby the driver C is driven by pulsating direct current, if such is necessary or desired.

One commercially available power supply or control unit which is effective in carrying out our invention is that unit produced by Western Controls Company in El Monte, California (dba Ultra Therm), and sold under the tradename "Ultra Massage".

Since there exists numerous well-known and commercially available power supplies which are specifically designed to attain the power modifications and controls suitable for desired controlled operation of our transducer unit, and since numerous new and special circuits can be designed and produced to attain such power modification and controls, without the exercise of invention and without altering or affecting the novelty and spirit of our invention, the disclosure of any one specific circuit would only serve to unduly burden this disclosure. Accordingly, detailed disclosure of any one particular power supply and/or control need not and will not be undertaken.

Having described only typical preferred forms and applications of our invention, we do not wish to be limited to the specific details herein set forth but wish to reserve to ourselves any modifications and/or variations that may appear to those skilled in the art and which fall within the scope of the following claims:

Having described our invention, we claim:

1. A transducer comprising an elongate frame with front and rear ends, support means projecting upwardly from the rear portion of the frame, an elongate longitudinally extending resilient armature with a rear end portion fixedly secured to and carried by the support means, said armature has a free front end portion terminating in vertical spaced relationship above the frame, weight means at and carried by the front end portion of the armature to increase the effective mass of and positioned to adjust the natural frequency of the armature, and an electro magnetic driver secured to the frame forward of the support means and having an upper end below the armature rearward of the weight means and defining a magnetic gap therebetween and power supply means delivering electric current to the driver at a frequency which is synchronistically tuned with the natural frequency of the armature.

2. The transducer set forth in claim 1 which further includes means to mount the frame to supporting structure in and through which motion generated by the unit is transmitted and a housing carried by the frame and enclosing the support means, drive unit, armature and weight means.

3. The transducer set forth in claim 1 which further includes an elongate resonator board between the ends of which said frame is fixed and support means at the ends of said board to engage an adjacent support structure whereby said board is held in free working spaced relationship with said support structure; the natural frequency of the board and the armature are compatible whereby the board vibrates freely in response to the vibrating motion of the armature.

4. The transducer set forth in claim 1 wherein the armature is established of an elongate wide, flat, strap of resilient material, said weight means includes a heavy metal block of limited longitudinal extent with a surface adjacent a surface of the armature, a longitudinally extending fastener receiving slot in and through the armature and a lock screw engaged through said slot and into the block.

5. The transducer set forth in claim 4 including mounting means to releasably secure the frame to a supporting structure into which motion generated by the unit is transmitted and a housing releasably engaged with the frame and enclosing the support means, coil unit, armature and weight means.

6. The transducer set forth in claim 4 which further includes an elongate motion distributing and transmitting resonator board between the ends of which said frame is fixed, mounting means at the ends of the board to engage an adjacent supporting structure and maintain the board spaced from said supporting structure, the natural frequencies of the board and the armature are compatible whereby vibrating movement of the armature and frame causes synchronous vibrating motion of the board between the ends.

7. The transducer set forth in claim 5 which further includes an elongate resonator baord between the ends of which said frame is fixed, mounting means at the ends of the board to engage an adjacent support structure and maintain the board in free spaced relationship from that supporting structure, the natural frequencies of the board and the armature are compatible whereby the board vibrates between its ends in response to and synchronously with the armature.

8. The transducer set forth in claim 1 which further includes an elongate motion distributing and transmitting resonator board between the ends of which said frame is fixed, mounting means at the ends of the board to engage an adjacent supporting structure and to maintain the board spaced from said supporting structure, the natural resonant frequencies of the board and the armature are compatible whereby effective vibrating movement of the armature causes the board to vibrate synchronously therewith, said board has a tuning part engaged therewith and shiftable longitudinally thereof to tune and set the frequency of the board.

9. The transducer set forth in claim 4 which further includes an elongate work engaging resonator board between the ends of which said frame is fixed and including mounting means at its opposite ends to engage a supporting structure, the natural frequencies of the board and the armature being compatible whereby maximum vibrating movement of the board is generated in response to the vibrating motion of the armature, said board has a part engageable therewith which is shiftable longitudinally of the board whereby the natural resonant frequency of the board can be adjusted.

10. The transducer set forth in claim 5 which further includes an elongate work engaging resonator board between the ends of which said frame is fixed and having mounting means at its opposite ends to engage a supporting structure, the natural frequencies of the board and the armature being compatible whereby effective vibrating movement of the board is generated by the vibrating weighted armature, said board has a part engageable therewith which is shiftable longitudinally of the board whereby the natural resonant frequency of the board can be adjusted.

* * * * *